United States Patent
Kozinski et al.

[11] Patent Number: 5,842,724
[45] Date of Patent: Dec. 1, 1998

[54] AIR BRAKE HOSE COUPLING MEMBER HAVING AN EXTENDED LOCKING LUG

[75] Inventors: Richard R. Kozinski, deceased, late of Canton, by Helen M. Kozinski, executor; Theodore C. Johnson, Jr., Solon, both of Ohio

[73] Assignee: T. C. Johnson Company, Chagrin Falls, Ohio

[21] Appl. No.: 779,986

[22] Filed: Dec. 23, 1996

[51] Int. Cl.⁶ .................................................... B60D 1/62
[52] U.S. Cl. ................................ 285/69; 74/527; 285/65
[58] Field of Search ................................. 285/65, 66, 67, 285/68, 72, 76, 77, 78, 79, 87, 69; 74/527

[56] References Cited

U.S. PATENT DOCUMENTS

| 509,114 | 11/1893 | Beery | 285/68 |
|---|---|---|---|
| 1,035,564 | 8/1912 | Forth | 285/68 |
| 1,039,731 | 10/1912 | Greenlaw | 285/68 |
| 1,317,535 | 9/1919 | Wilson | 285/352 |
| 1,558,601 | 10/1925 | Farmer | 285/68 X |
| 3,646,980 | 3/1972 | Peterson | 150/52 R |
| 3,879,066 | 4/1975 | Kozinski | 285/69 |
| 4,625,280 | 11/1986 | Ammann et al. | 285/67 X |
| 5,388,864 | 2/1995 | Kozinski | 285/78 |
| 5,683,148 | 11/1997 | Li et al. | 285/65 X |

FOREIGN PATENT DOCUMENTS

| 23148 | 7/1930 | Australia | 285/68 |

Primary Examiner—Eric K Nicholson
Assistant Examiner—Greg Binda
Attorney, Agent, or Firm—Sand & Sebolt

[57] ABSTRACT

A coupling member for detachably connecting together two sections of air brake hose between railroad cars. Each coupling member has a hollow tubular body with one end attached to a section of hose and with an opposite end having an arcuate body portion extending circumferentially about and outwardly of the tubular body, and has an arcuate locking lug with a guide and protection surface followed by a locking surface extending generally axially from the body concentric with and projecting along substantially the entire arcuate body portion. An L-shaped arcuate flange projects outwardly and forwardly from a rear portion of the tubular body and is provided with a lip which engages a similar lip formed on the arcuate locking lug of the other of two coupling members to secure the members in coupled position where the lip projects from only a locking portion of the lug while a guide portion has a smooth surface. An elastomeric gasket is mounted within the bore of the tubular body and forms an airtight seal with a similar gasket mounted on the other coupling member. A finger is pivotally mounted within a radially extending slot formed in an arcuate end body portion of the tubular body. A protective flap is secured over the finger to protect the finger from weather related and environmental hazards, while providing a slit to allow for locking and unlocking motion.

30 Claims, 4 Drawing Sheets

AIR BRAKE HOSE COUPLING MEMBER HAVING AN EXTENDED LOCKING LUG

BACKGROUND OF THE INVENTION

1. Technical Field

The invention relates to the coupling of two similar coupling members for detachably connecting the ends of air brake hoses for trucks or railroad cars to form an airtight connection. More particularly, the invention relates to an improved air brake hose coupling member having an extended lip and a protective cover over the finger lock. Specifically, the invention relates to an improved air brake hose coupling member having both (1) an extended lip that both (a) protects the finger lock from environmental hazards including rocks and debris on the rail bed should the coupling member be dragged by the train and (b) improves the ability of the to-be-coupled couplings to align with the ramped entrance angle of the opposing coupling, and (2) a flexible protective cover over the finger lock for protecting the finger when locked from the environment including ice buildup.

2. Background Information

Railroad cars having pneumatic brake systems use flexible air hoses which extend the length of the train by spanning between separate yet adjacent railroad cars. Typically, at least one flexible hose extends from the front to the back of a railroad car with a fluid connection branching off to the emergency brake system midway therebetween (except for the engine where the hose does not extend from the front thereof). A coupling member such as that shown in FIG. 7 or in U.S. Pat. No. 5,388,864 is attached to each end of each flexible hose for detachably connecting the hose sections of adjacent cars together when individual railroad cars are joined to form a unit train. These coupling members whether connected to another coupling member or not are suspended from the end of the car and hang a short distance above the ground or railroad tracks. Overall, these couplings are designed and manufactured to meet the requirements of the Association of American Railroads (AAR) and are generally similar, so as to be compatible and interchangeable with those of other manufacturers. These AAR design guidelines require very accurate engagement and proper alignment of the couplings prior to rotational coupling thereof.

These rigid and demanding AAR guidelines are a result of the realization that any misalignment of the couplings and/or any damage to the entrance angle area may result in either inability to couple or ineffective coupling that throws the couplings out of alignment. If these couplings are thrown out of alignment, any rotation of the coupling as is needed to lock the couplings together causes the gaskets to be pushed out of the gasket groove or misalignment. The result of such misaligned gaskets or where one or more gaskets is improperly seated such as not in its groove, is that the coupled connection can at any time and almost instantaneously leak and/or fail thereby halting the entire train.

In more detail and as is well known in the art, these couplings are joined together by pulling the hoses from adjacent cars upward, pushing the sealing gaskets on the coupling members at the end of each hose into aligned and abutting relationship, and then rotating the coupling members downward which interengages mating flanges and lugs extending from the coupling members. If properly performed, this results in a sealed fluid passage between air hoses on adjacent railroad cars whereby the air pressure in the hose lines maintains the brakes of all of the individual cars in an "off" position. Any significant reduction in air pressure within these hose lines actuates the brakes in all of the individual cars to an "on" or braking position. Thus, if the train were to derail, or cars were to accidentally separate, or if for any other reason the air was to leak resulting in decreased pressure then all of the cars go into this braking position. In sum, accidental separation of the coupling between two sections of air hose will apply the emergency brakes of each car of the train, resulting in sudden stopping of the train with the subsequent delay, inconvenience and expense as well as chance of accidents. It is thus desirous to avoid any accidental disconnection of the couplings.

Clearly, each connection of adjacent coupling members is critical since only one leak stops the entire train. However in operation, the couplings are often difficult to properly align as indicated above. Improper alignment often either results in an ineffective (leaky) seal or no seal at all. Presently it is believed that as many as 25% of all coupled members at least nominally leak thereby putting the train at risk for an undesirable braking situation should any more substantive leaking result therefrom.

Overall, improper alignment of the gaskets causes poor or ineffective sealing due to gasket misalignment which results in a higher likelihood of uncoupling of air hose couplings due to misalignment of the gaskets, or poor sealing both of which result in too little pull apart or separation resistance. This lack of separation resistance causes the air hose couplings to fall apart which immediately throws the entire train into an emergency brake application. All of this results in added costs and time, as well as increased risk of both property damage and personal injury, all of which are undesirable.

Thus, a need has existed for an improved air brake hose coupling member which enables rapid and reliable connection of hose sections in the heretofore usual manner without additional manipulations being required, and which assures proper alignment every time while not affecting the usual rotational connection, separation and operation of such coupling members, or the usual axial separation and operation of such coupling members while preventing or considerably reducing premature uncoupling of the attached members in an axial manner due to improper gasket alignment and/or poor sealing.

The prior art coupling members such as is shown in FIG. 7 or disclosed in U.S. Pat. No. 5,388,864 although well suited for its designed purpose, do not assure with a high degree of reliability the correct alignment of gaskets. The lugs in the prior art effectively serve its intended purpose of securing one coupling member to another. However, the length of the lugs of the prior art is merely sufficient to perform this securing operation only.

It has been further realized that the coupling operation occurs in an awkward position in that the railroad worker must reach down, bend the hoses back, and then try to align the coupling faces. Once alignment is achieved, rotational securing is performed. Often, the railroad worker must perform this operation blindly, that is with very little or no visual assistance due to the coupling position, generally poor lighting conditions in between railroad cars, and sometimes adverse weather. For these reasons, proper alignment is further made difficult to achieve. It is thus desirous to supply a coupling that is more readily used in a blind manner while improving reliability as to alignment of the gaskets.

Furthermore, with the invention of the locking finger as disclosed in U.S. Pat. No. 5,388,864, a reliable means of assuring continued coupling of two attached coupling members has been provided. This locking finger is pivotally mounted within a radially extending slot formed in an arcuate end body portion of the tubular body on each coupling member. The finger preferentially has a bent outer end which traps a corner of the L-shaped arcuate flange of an opposing coupling member upon the two members being rotated toward the uncoupled position but prior to reaching this position thereby prohibiting premature rotational uncoupling of the two members.

However, this locking finger is subject to damage should the coupling member either contact the ground, that is be dragged, or should air-born rocks or debris make contact with the finger. The result of such undesirable contact is a damaged or broken finger which will no longer properly function as required.

Thus, a need exists for protecting the locking finger from environmental hazards such as air-born rocks and debris, as well as from damage incurred if the coupling member were to contact the ground due to either impact or continual dragging.

SUMMARY OF THE INVENTION

Objectives of the invention include providing an improved air brake hose coupling member which meets the requirements of the Association of American 10 Railroads or Society of Automotive Engineers and which is compatible or interchangeable with existing coupling members being used.

It is a further object of the invention to provide an improved air brake hose coupling member that is easier to align with a second coupling member for abutting the seal and mating the members to provide a closed air passageway between members.

A still further objective of the invention is to provide such an improved air brake hose coupling member having an extended lip providing improved alignment of to-be-coupled couplings at the ramped entrance angle.

An even further objective of the invention is to provide such a coupling member having a protective shield for protecting the ramped entrance angle from physical environmental contact such as with the ground.

A yet even further objective of the invention is to provide such a coupling member having an extended leg for protecting the ramped entrance angle from physical environmental contact such as with the ground.

Another objective of the invention is to provide such a coupling member having a protective flap for covering a locking finger used to prevent premature uncoupling of coupled coupling members due to accidental upward rotational movement.

A further objective of the invention is to provide such a coupling member which eliminates difficulties encountered with prior coupling members in alignment with another coupling member and which achieves the stated objectives in a simple, effective and efficient manner.

Another objective of the invention is to provide a means of protecting the locking finger from damage incurred by air-born rocks and debris, or by contact with the ground due to impact or continual dragging.

A further objective of the invention is to simultaneously provide improved alignment and locking finger protection.

The objectives and advantages are obtained by the improved air brake hose coupling member of the present invention, the general nature of which may be stated as including an improved air brake hose coupling member having a generally tubular body with a neck at one end adapted to be connected to an air hose, and with an inner coupling face at the other end extending around an air passage, the improvement including an arcuate locking lug projecting outwardly from the inner coupling face along a portion of the inner coupling face, and a raised lip projecting from only a portion of the arcuate locking lug.

BRIEF DESCRIPTION OF THE DRAWINGS

Preferred embodiments of the invention, illustrated of the best modes, in which applicant have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
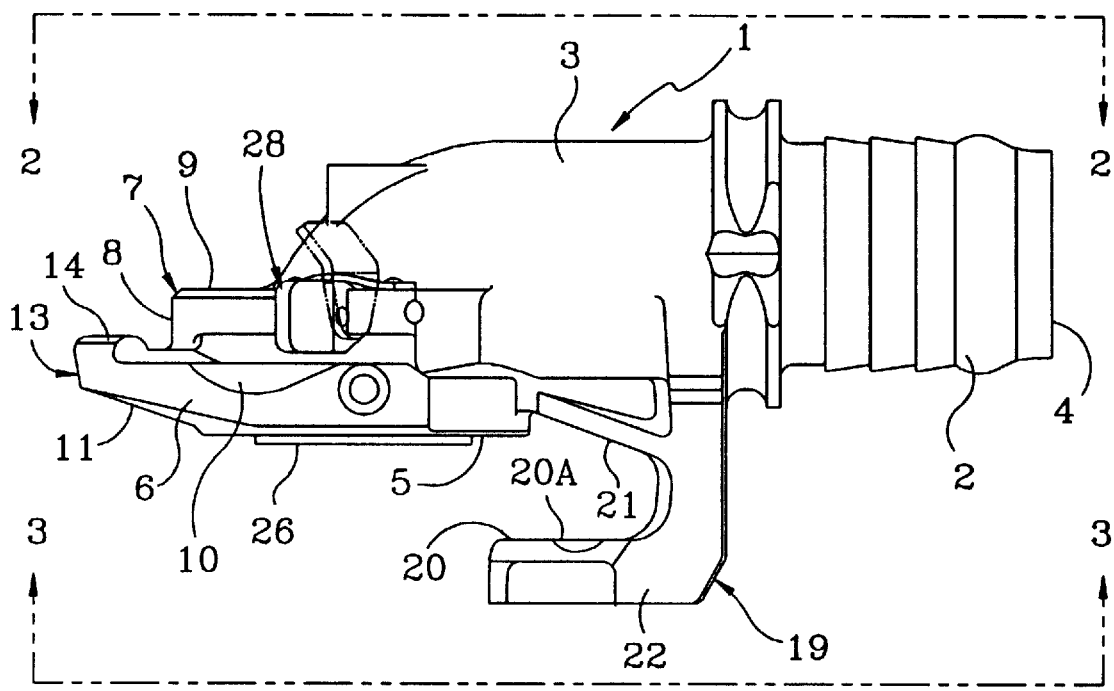
FIG. 1 is a side elevational view of the improved air brake house coupling member of the present invention.
Figure 2:
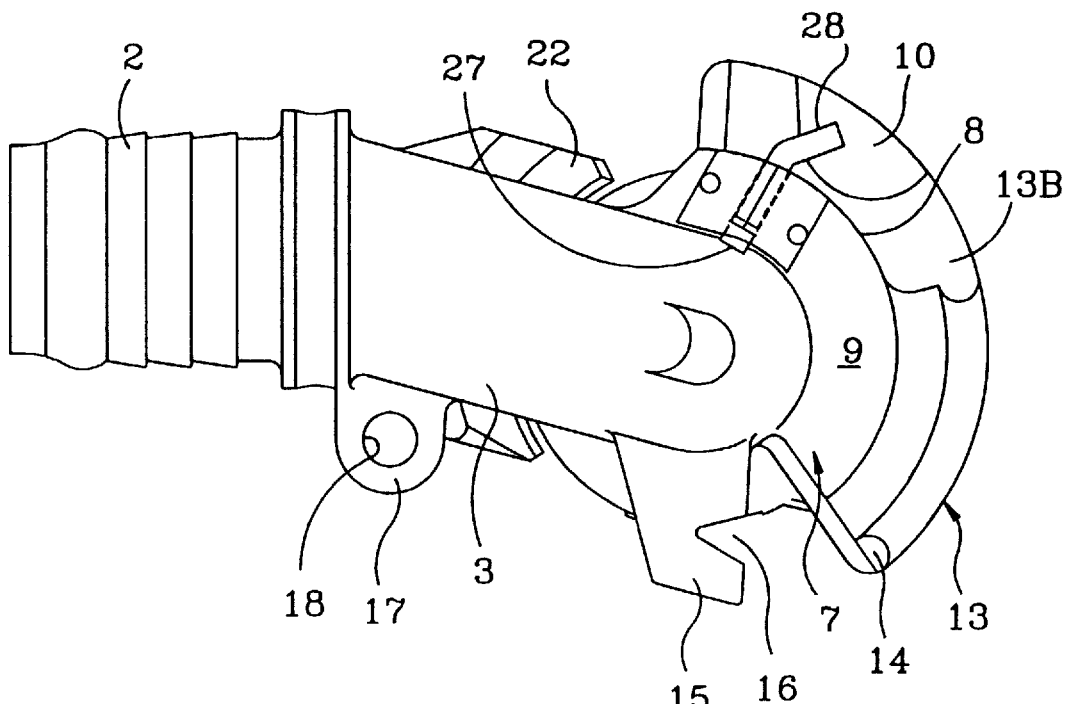
FIG. 2 is a top plan view looking in the direction of arrows 2—2, FIG. 1.
Figure 3:
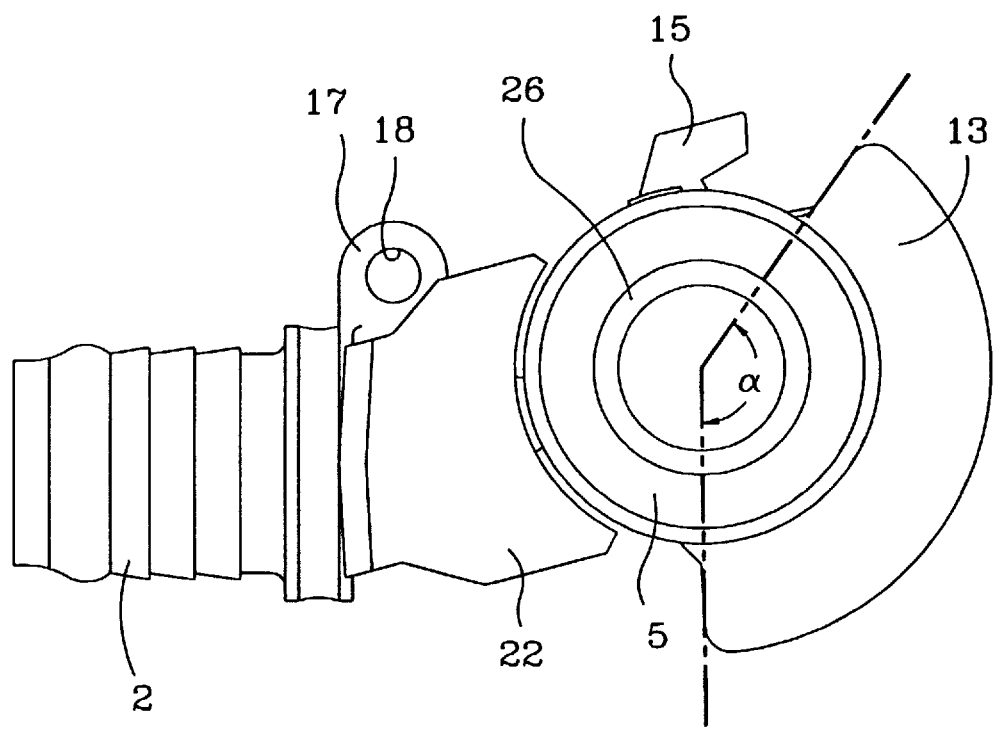
FIG. 3 is a bottom plan view looking in the direction of arrows 3—3, FIG. 1.

A first embodiment of the improved air brake hose coupling member of the present invention is indicated generally at 1, and is best shown in FIGS. 1, 2 and 3. Coupling member 1 is similar in most respects to the coupling member shown in U.S. Pat. No. 5,388,864, the content of which are incorporated herein by reference, except it has the extended lug and protective flap features as described below which are not available on prior art coupling members.

Coupling member I has a tubular neck 2 which is connected to a usual flexible hose (not shown) of a railroad car braking system, and is preferably connected at an angle of approximately 15° with a tubular body 3, as shown in FIGS. 2 and 3. Tubular body 3 has a bore 4 which terminated at an inner coupling face 5 which is generally flat and has an annular configuration and is located on a generally circular body portion 6 of body 3. The plane of coupling face 5 is generally parallel with the axis of the flexible hose as it extends into the bore extending through body 3 and neck 2, as can be seen in FIG. 1.

The front portion of tubular body 3 terminates in an arcuate flanged body portion 7 which has a curved front surface 8 and a curved flat top surface 9 (FIGS. 1 and 2). An arcuate flange, generally indicated at 11 and shown in FIG. 1, projects outwardly from body 3 and extends in a generally circular fashion generally concentric with and spaced below arcuate front surface 8. Flange 11 includes an arcuate-shaped end locking lug 13 which projects outwardly from body 3. Lug 13 includes a locking portion 13A which terminates in a raised rounded lip 14, and a guide portion 13B with a smooth termination except for a finger cut-out 10. This flange 11 extends outwardly from body 3 along substantially the entire curved flat top surface 9 as is clearly shown in FIG. 2 while lip 14 projects outwardly from a portion of lug 13, namely, the locking portion 13A, in a direction away from coupling face 5, as shown in FIG. 1.

A stop member 15, as shown in FIG. 2, is formed on body 3 and projects outwardly from the top portion thereof, and is formed with a generally V-shaped notch 16 which circumferentially aligns with the flange end at arcuate front surface 8. Stop 15 and notch 16 limit the rotational movement of a pair of coupling members 1 with respect to each other when rotated in the coupling direction, as shown particularly in FIG. 5. A boss 17 (FIGS. 2 and 3) is formed on body 3 adjacent neck 2 and has an opening 18 to permit a chain, strap or other supporting device to be connected to coupling member 1 to positively support joined members 1 between a pair of railroad cars and at least four inches above the track.

An L-shaped annular flange, indicated generally at 19 (FIG. 1), extends laterally outwardly from body 3 and has a leg 22 which extends forwardly in a generally parallel relationship with body 3. Flange 19 cooperates with locking lug 13 of the mating coupling member, and vice versa, to couple a pair of members 1 together. Flange 19 includes an arcuate lip 20 which projects toward coupling face 5 and interlocks with lip 14 of flange 11 of a corresponding coupling member 1 when the two coupling members are rotatably connected together. When coupled together, lip 14 seats in an arcuate groove 20A formed adjacent lip 20 and concentric therewith. Flange 19 also is formed with various reinforcing ribs 21 to provide the desired strength for the coupling member.

An annular recess is formed in body 3 about bore 4 adjacent coupling face 5, for receiving a sealing gasket 26 therein (FIG. 3). Gasket 26, when seated in the recess, extends outwardly beyond face 5, as shown in FIG. 1, and engages and aligns with a corresponding gasket of a second coupling member 1 when the two members are joined together. Gaskets 26 are held under compression when the two coupling members 1 are joined and form an air passageway between the coupling members.

Figure 4:
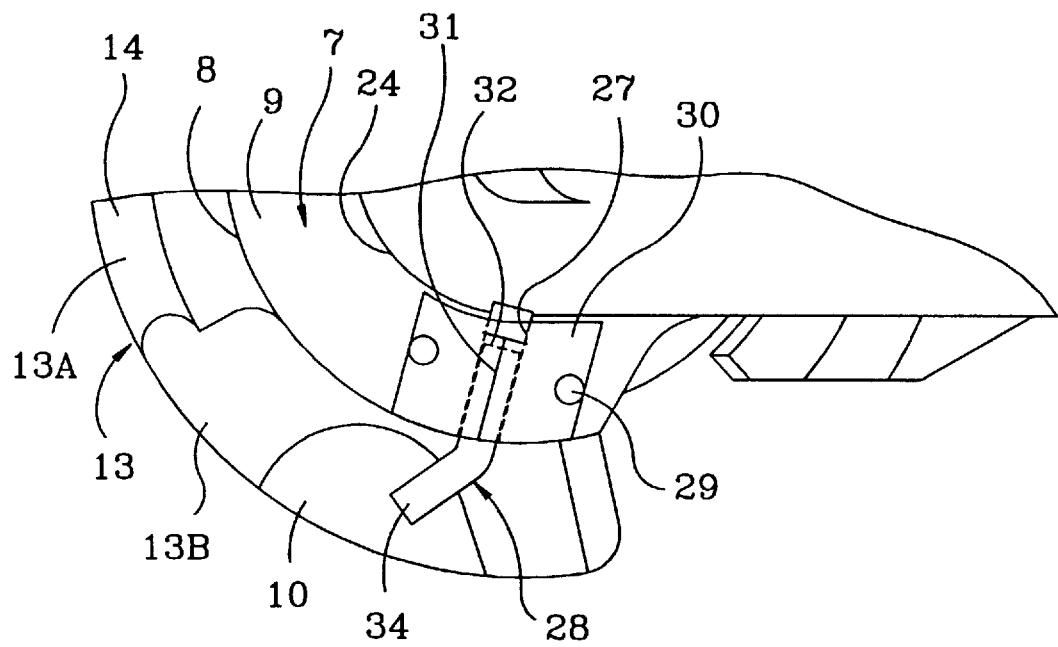
FIG. 4 is a greatly enlarged fragmentary view of the locking finger with the protective flap and the extended flange of the improved coupling member.

A generally radially extending slot 27 is formed in body flange 7 (FIGS. 2 and 4). spaced circumferentially inwardly from and generally adjacent to the inner end 24 of flange body portion 7. A locking finger 28 (FIGS. 1, 2 and 4), is pivotally mounted within slot 27 by a pin so as to be pivotal from an unlocked position where the finger extends outward from curved flat top surface 9 to a locked position where the finger extends outward from curved front surface 8. Finger 28 includes an outer bent end section 34, which in the preferred embodiment, forms an included angle of approximately 45° with inner finger end 32.

A protective flap 30 (FIGS. 1, 2 and 4) is affixed to curved flat top surface 9. Flap 30 includes a slit 31 through which finger 28 passes during pivotal movement and remains in when the finger is in an unlocked position. This slit 31 protects the finger 28, and particularly the slot 27 in which the finger pivots, from environmental concerns of the weather variety such as rain, snow, and ice, as well as the contaminant variety such as dirt and rocks. Flap 30 is particularly useful when finger 28 is in the unlocked position, that is, extending out of flat top surface 9 rather than front surface 8. Flap 30 is preferably a flexible material such as rubber and is affixed to surface 9 in any known manner including using adhesives or fasteners such as rivets 29 in the embodiment shown.

Hose sections (not shown) which connect to neck 2 extend outwardly from the ends of adjacent railroad cars, and are connected to the appropriate air lines and associated brake equipment mounted on the cars. A coupling member 1 is attached to the end of each of the hoses and is located generally under the mechanical coupler mechanism of the railroad car so that a trainman can easily grasp members 1 which are supported by a separate chain or other device connected to boss 17 to provide support.

Figure 5:
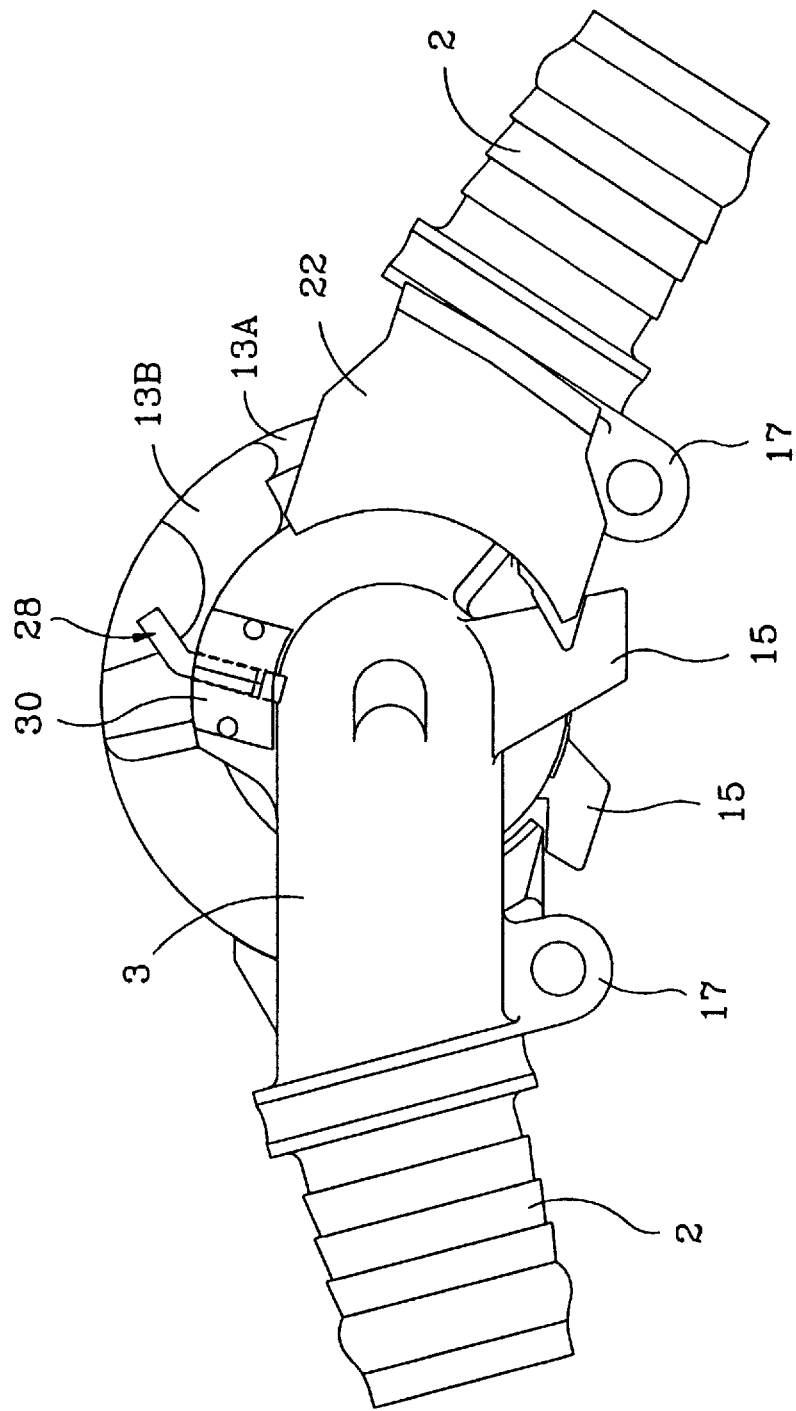
FIG. 5 is a view similar to FIGS. 2 and 3 combined, showing a pair of the improved coupling members in their engaged locked position.

In a usual air brake hose coupling procedure, a trainman will grasp a pair of adjacent coupling members 1, one in each hand, and bend the hose ends upwardly so that members 1 are in an adjacent position, generally beyond the position of FIG. 5. The coupling faces 5 are then moved together, bringing gaskets 26 into an abutting compressed relationship with respect to each other. Prior to this, locking finger 28 is moved to the unlocked position, as shown by dot-dash lines in FIG. 1.

In accordance with the invention, lug 13 which extends along the entire arcuate front surface 8 provides (1) locking finger protection, (2) a blind guide for the railroad worker during coupling, and (3) assured alignment prior to and during rotation resulting in coupling. The prior art coupling members, with lugs that extended along approximately one-half the arcuate front surface and were less than 90° and preferably 40° to 70° around the inner coupling face, allowed for substantial play of two abutting yet unlocked couplings, did not supply a guide during the alignment and twisting, that is locking, motion, and did not protect the locking finger from damage due to impact with the ground or continual dragging along the ground. The locking lip in the prior art extended the entire length of the short lug. In contrast, the extended lug 13 and extends along substantially the entire arcuate front surface and is-greater than one-quarter (90°) around the inner coupling and often approaching 150°. The proportion of the inner coupling face 5 along which extended lug 13 extends is represented by the symbol $\alpha$, as is best depicted in FIG. 3. This extended lug 13 provides a guide and protection area 13B prior to locking with locking lip 14 which extends less than the entire lug length and only approximately one-half the lug length in the embodiment shown where the locking portion 13A and the locking lip 14 extend the same distance around the arcuate front surface 8 as in the prior art.

After placing gaskets 26 in the compressed abutting relationship with the leg 22 and arcuate surface 20A on each coupling member adjacent the guide and protection portion 13B of the opposite coupling member, members 1 are rotated downwardly in opposite directions with respect to each other by the trainman until they assume the coupled engaged position of FIG. 5. Lips 14 and 20 of flanges 11 and 19 are interlocked with each other in a usual manner, and are held in engaged position by the force exerted by the mated compressed sealing gasket 26. In effect, the tubular bodies rotate with respect to each other such that the lips 14 on each slide along the lug 13 from the guide and protection portion 13B to the locking position 13A. Gasket 26 and lips 14 and 20 resist the axial separation of coupled members 1 when in the coupled position, when the members experience small forces applied axially on the hose sections. However, when a large axial force is applied, as during uncoupling of adjacent cars, the two members will axially separate as is well known in the art and disclosed in U.S. Pat. No. 5,388,864 and previously incorporated by reference. The coupled members 1 assume the locked or coupled position of FIG. 4, suspended between adjacent railroad cars, during normal use.

In further accordance with the invention, fingers 28 are manually pivoted downwardly by the trainman to their locked position, overcoming either the biasing force of a spring or the frictional engagement of material projections as is known in the art, after the members are rotated to their coupled locked position of FIG. 5. This downward rotation of fingers 28 effectively moves the fingers from a position extending outward from curved flat top surface 9 to a position extending outward from curved front surface 8. During this downward rotation, each finger passes into slit 31 in protective flap 30.

Coupled members 1 are prevented from continued rotation in the locking direction after proper engagement of flange 11 and 19 by locking edges 44 of flange leg 22 engaging stop member 15 within V-shaped notches 16. Joined coupling member 1 remain in the position of FIG. 4 until rotationally uncoupled by a trainman, or most often by a sufficiently large force exerted in an axial direction to overcome the compressive force exerted by gasket 26. It is the usual practice in uncoupling air brake hoses of railroad cars to first uncouple the mechanical coupler mechanism, and then by moving one of the cars away from the other, a sufficiently large axial force is exerted on the joined members to overcome the compressive force of gasket 26, whereupon the members separate or pull apart in an axial direction. The generally rounded formation of interlocked lips 14 with lips 20 and the spacing between coupling faces 5 provided by abutting gaskets 26, permit faces 5 to move toward each other compressing gaskets 26, enabling lips 14 and 20 to become disengaged from each other. Locking fingers 28 do not prevent or hinder in any way such usual axial uncoupling procedure.

In even further accordance with the invention, the extended lug 13 and, more particularly, the guide and protection area 13B protect locking finger 28 from contact with the ground should the coupling member make brief or continued contact with the ground. The result is the prevention of damage or breaking of locking finger 28.

Figure 6:
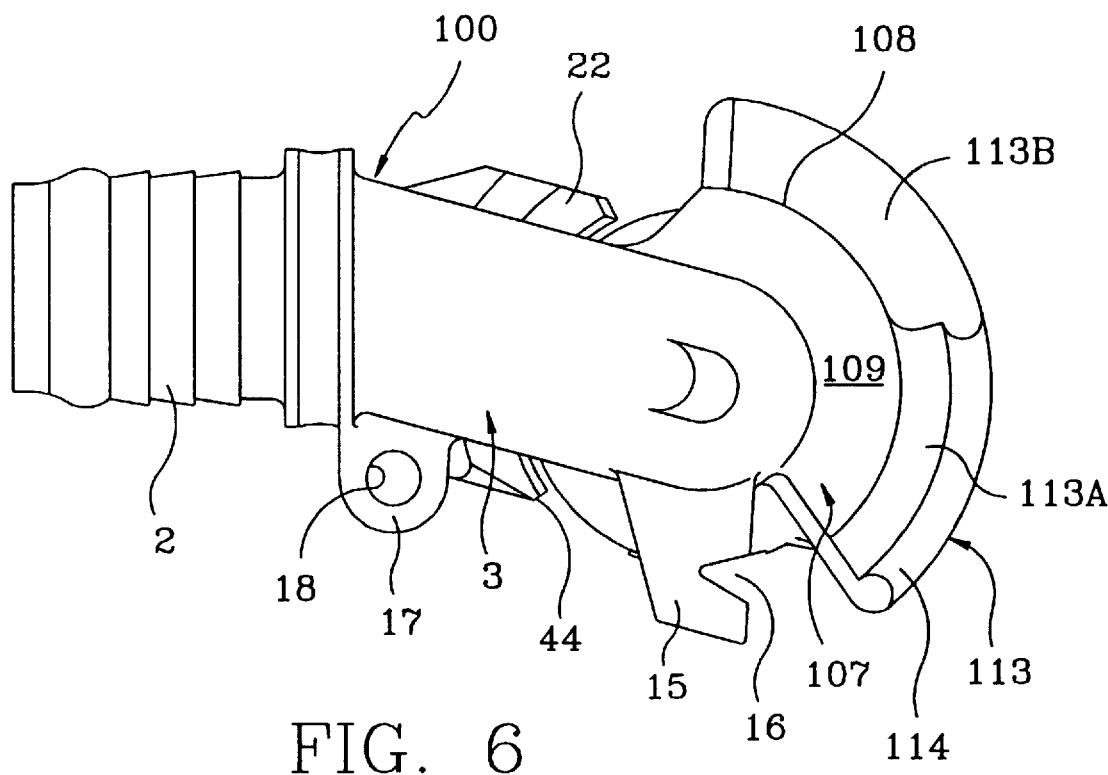
FIG. 6 is a plan view similar to FIG. 2 of a modified coupling member.
Figure 7:
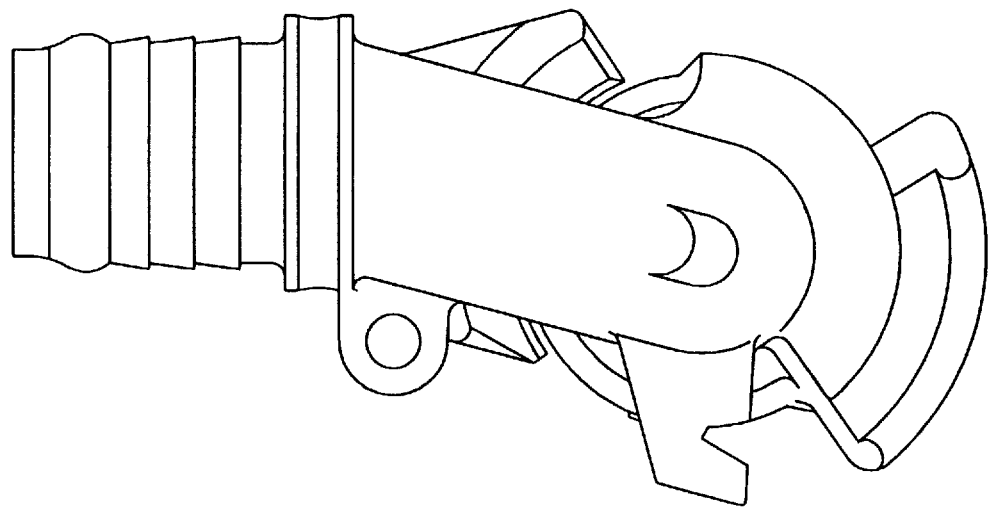
FIG. 7 is a plan view similar to FIG. 2 of the prior art coupling member, of which the present invention is an improvement thereon.

Another embodiment of the new and improved coupling member is shown as 100 in FIG. 6. Identical elements are similarly numbered to those of the first embodiment of FIGS. 1–5. Coupling member 100 is substantially similar to coupling member 1 except the locking finger and related assemblies including the protective flap are not present.

Coupling member 100 includes an extended lug 113 extending from an arcuate flanged body portion 107 which has a curved front surface 108 and a curved flat top surface 109. Extended lug 113 includes a guide portion 113B and a locking portion 113A with a locking lip 114.

In the case of either embodiment, numerous benefits are provided. One such benefit is that the design assures very accurate engagement and proper alignment. Specifically, the extended lug protects the entrance angle from damage due to contact with the ground. By protecting the entrance angle area, reliable alignment and securing of couplings together is maintained.

A second benefit is that this extended lug further provides a guide surface for the railroad worker to align with another coupling member. Since this coupling procedure occurs blindly and sometimes without sufficient light and in inclement weather, this guide surface assures proper alignment which is critical. Thus, the result is that the railroad worker can orient, align and rotate the coupling members without looking at either.

A final benefit that is only applicable to the first embodiment of FIGS. 1–5, is that this extended lug provides protection for the locking finger from contact with the ground.

The extended lug with new guide surface in both embodiments and the protective flap in the first embodiment provide a coupling member which is effective, safe, inexpensive, efficient in assembly, operation and use, and which achieves all the enumerated objectives, provides for eliminating difficulties encountered with prior couplers, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coupler is constructed and used, the characteristics of the construction, and the advantageous, new and useful results obtained; the new and useful structure, devices, elements, arrangements, part and combinations, are set forth in the appended claims.

We claim:

1. An improved air brake hose coupling member for rotational coupling with another coupling member having a generally tubular body with a neck at one end adapted to be connected to an air hose, and with an inner coupling face at the other end extending around an air passage, the coupling member also having a locking flange, the improvement including an arcuate locking lug projecting outwardly from the inner coupling face along a portion of the inner coupling face, and the arcuate locking lug comprising a first surface terminating radially in a substantially smooth edge and a second surface adjacent to said first surface, with said second surface terminating in a raised lip extending circumferentially along substantially the entire length of an outer edge of said second surface and projecting obliquely outward therefrom, said first surface adapted to engage the locking flange of another coupling member in a first rotational position and to guide the locking flange into rotational engagement with said second surface in a second rotational position.

2. The improved air brake hose coupling member as set forth in claim 1 further comprising a locking finger pivotably attached to the tubular body and being capable of pivoting from substantially adjacent the tubular body to substantially adjacent the arcuate locking lug.

3. An improved air brake hose coupling member having a generally tubular body with a neck at one end adapted to be connected to an air hose, and with an inner coupling face at the other end extending around an air passage, the improvement including an arcuate locking lug protecting outwardly from the inner coupling face along a portion of the inner coupling face, the arcuate locking lug comprising a first surface terminating radially in a substantially smooth edge and a second surface terminating in a raised lip projecting obliquely outward therefrom, a locking finger pivotably attached to the tubular body and being capable of pivoting from substantially adjacent the tubular body to substantially adjacent the arcuate locking lug, and a protective flap for selectively protecting the locking finger from the environment.

4. The improved air brake hose coupling member as set forth in claim 3 wherein the protective flap includes a slit therein.

5. The improved air brake hose coupling member as set forth in claim 4 wherein the slit is in alignment with the locking finger.

6. The improved air brake hose coupling member as set forth in claim 5 further comprising an arcuate flanged body portion projecting outwardly from the tubular body, wherein the arcuate locking lug projects outwardly from the arcuate flanged body portion along substantially the entire outer perimeter of the arcuate flanged body portion.

7. The improved air brake hose coupling member as set forth in claim 6 wherein the protective flap is affixed to the arcuate flanged body portion.

8. The improved air brake hose coupling member as set forth in claim 7 wherein the arcuate flanged body portion includes a curved flat top surface and a curved front surface.

9. The improved air brake hose coupling member as set forth in claim 8 wherein the protective flap is affixed to said curved flat top surface and the locking finger pivots from within a slot in the arcuate flanged body portion such that the protective flap protects the pivot of the locking finger within the slot from the environment when the locking finger is pivoted to adjacent the arcuate locking lug.

10. An improved air brake hose coupling member having a generally tubular body with a neck at one end adapted to be connected to an air hose, and with an inner coupling face at the other end extending around an air passage, the improvement including an arcuate locking lug projecting outwardly from the inner coupling face along a portion of the inner coupling face, the arcuate locking lug comprising a first surface terminating radially in a substantially smooth edge and a second surface terminating in a raised lip projecting obliquely outward therefrom, wherein the arcuate locking lug extends around at least substantially one-quarter of the inner coupling face.

11. The improved air brake hose coupling member as set forth in claim 10 wherein the arcuate locking lug extends around at least one-third of the inner coupling face.

12. The improved air brake hose coupling member as set forth in claim 11 wherein the locking lip extends along approximately one-half of the arcuate locking lug.

13. An improved air brake hose coupling member having a generally tubular body with a neck at one end adapted to be connected to an air hose, and with an inner coupling face at the other end extending around an air passage, the improvement including an arcuate locking lug projecting outwardly from the inner coupling face along a portion of the inner coupling face, the arcuate locking lug comprising a first surface terminating radially in a substantially smooth edge and a second surface terminating in a raised lip projecting obliquely outward therefrom, and a locking finger pivotably attached to the tubular body and being capable of pivoting from substantially adjacent the tubular body to substantially adjacent the arcuate locking lug, wherein the first surface includes a finger hole adjacent the locking finger.

14. An improved air brake hose coupling member having a generally tubular body with a neck at one end adapted to be connected to an air hose, and with an inner coupling face at the other end extending around an air passage, the improvement including an arcuate locking lug projecting outwardly from the inner coupling face along a portion of the inner coupling face, the arcuate locking lug comprising a first surface terminating radially in a substantially smooth edge and a second surface terminating in a raised lip projecting obliquely outward therefrom, and a locking finger pivotably attached to the tubular body and being capable of pivoting from substantially adjacent the tubular body to substantially adjacent the arcuate locking lug, wherein the first surface includes a finger hole and the surface protects the locking finger from radial forces as well as assists in aligning the coupling member during coupling with another coupling member.

15. The improved air brake hose coupling member as set forth in claim 14 wherein the second surface provides a locking surface during coupling with another coupling member.

16. An improved air brake hose coupling member having a generally tubular body with a neck at one end adapted to be connected to an air hose, and with an inner coupling face at the other end extending around an air passage, the improvement including an arcuate locking lug projecting outwardly from the inner coupling face along a portion of the inner coupling face, a raised lip projecting from only a portion of the arcuate locking lug, a locking finger pivotably attached to the tubular body, and a protective flap for selectively protecting the locking finger from the environment.

17. The improved air brake hose coupling member as set forth in claim 16 wherein the protective flap includes a slit therein in alignment with the locking finger.

18. The improved air brake hose coupling member as set forth in claim 18 wherein the arcuate locking lug extends around at least one-quarter of the inner coupling face.

19. The improved air brake hose coupling member as set forth in claim 18 wherein the locking lip extends along approximately one-half of the arcuate locking lug.

20. The improved air brake hose coupling member as set forth in claim 16 wherein the arcuate locking lug includes a guide surface and a locking surface.

21. An interlocking hose coupling having at least first and second rotatably engaging bodies which couple respectively associated hoses in a substantially axial aligned manner, said coupling being disengageable when sufficient separation forces are exerted axially along said hoses, where at least one of said bodies comprises locking means extending therefrom, and at least one of said bodies comprises rotational alignment and lock receiving means extending therefrom, where prerotational alignment means extends from the rotational alignment and lock receiving means, and where the prerotational alignment means being arranged to selectively align the locking means with the rotational alignment and lock receiving means prior to rotational engagement of the locking means with the rotational alignment and lock receiving means to assure proper alignment upon such rotational locking motion, the rotational alignment and lock receiving means on each of the first and second bodies being arranged to selectively receive the locking means on the other of the second and first bodies, respectively, after proper alignment by the prerotational alignment means thereby allowing rotatable motion and alignment of said bodies when engaged such that rotation in a first direction secures the bodies together as the locking means are received by the rotational alignment and lock receiving means, and once the bodies are secured further rotation in the first direction is impeded by a fixed stopping means on at least one of the bodies and is selectively impeded in a second direction reverse of said first direction by an adjustable stopping means.

22. The interlocking hose coupling as set forth in claim 21 wherein each of the bodies includes a tubular body terminating in an arcuate flanged body portion having a curved front surface and a curved flat top surface.

23. The interlocking hose coupling as set forth in claim 22 wherein the locking means includes a locking leg extending substantially parallel to the tubular body.

24. The interlocking hose coupling as set forth in claim 23 wherein the locking leg terminates at an outermost edge in a raised rounded lip.

25. The interlocking hose coupling as set forth in claim 22 wherein fixed stopping means includes a stop member with a notch therein.

26. The interlocking hose coupling as set forth in claim 22 wherein the adjustable stopping means includes a locking finger pivotably attached within arcuate flanged body portion.

27. The interlocking hose coupling as set forth in claim 21 wherein the prerotational alignment means further include means for protecting the adjustable stopping means.

28. The interlocking hose coupling as set forth in claim 27 wherein the prerotational alignment means includes a locking portion of a locking lug projecting from an arcuate flanged locking portion adjacent adjustable stopping means.

29. An interlocking hose coupling having at least first and second rotatably engaging bodies which couple respectively associated hoses in a substantially axial aligned manner, said coupling being disengageable when sufficient separation forces are exerted axially along said hoses, where at least one of said bodies comprises locking means extending therefrom, and at least one of said bodies comprises rotational alignment and lock receiving means extending therefrom, where prerotational alignment means extends from the rotational alignment and lock receiving means, and where the prerotational alignment means being arranged to selectively align the locking means with the rotational alignment and lock receiving means prior to rotational engagement of the locking means with the rotational alignment and lock receiving means to assure proper alignment upon such rotational locking motion, the rotational alignment and lock receiving means on each of the first and second bodies being arranged to selectively receive the locking means on the other of the second and first bodies, respectively, after proper alignment by the prerotational alignment means thereby allowing rotatable motion and alignment of said bodies when engaged such that rotation in a first direction secures the bodies together as the locking means are received by the rotational alignment and lock receiving means, and once the bodies are secured further rotation in the first direction is impeded by a fixed stopping means on at least one of the bodies and is selectively impeded in a second direction reverse of said first direction by an adjustable stopping means, each of the bodies including a tubular body terminating in an arcuate flanged body portion having a curved front surface and a curved flat top surface, the adjustable stopping means including a locking finger pivotably attached within the arcuate flanged body portion, and a protective flap for selectively protecting the locking finger from the environment.

30. The interlocking hose coupling as set forth in claim 29 wherein the protective flap includes a slit therein.

\* \* \* \* \*